United States Patent

Dingwall

[15] 3,651,342

[45] Mar. 21, 1972

[54] APPARATUS FOR INCREASING THE SPEED OF SERIES CONNECTED TRANSISTORS

[72] Inventor: Andrew Gordon Francis Dingwall, Somerset, N.J.

[73] Assignee: RCA Corporation

[22] Filed: Mar. 15, 1971

[21] Appl. No.: 124,208

[52] U.S. Cl. ..............................307/251, 307/208, 307/215, 307/237, 307/304

[51] Int. Cl. ..........................................................H03k 17/60

[58] Field of Search..................307/205, 208, 215, 237, 238, 307/251, 279, 304

[56] References Cited

UNITED STATES PATENTS

| | | | |
|---|---|---|---|
| 3,536,936 | 10/1970 | Rubinstein et al. | 307/251 X |
| 3,564,299 | 2/1971 | Varadi et al. | 307/251 X |
| 3,582,683 | 6/1971 | Podraza | 307/251 |

*Primary Examiner*—Stanley T. Krawczewicz
*Attorney*—H. Christoffersen

[57] ABSTRACT

Two paths connected in parallel between an output terminal and a point of reference potential. One path is comprised of N field-effect transistors having their conduction paths connected in series and the second path is comprised of two transistors having their conduction paths connected in series, where N > 2. One transistor in the second path is turned on concurrently with the transistor in the first path connected to the output terminal and the other transistor in the second path is turned on in response to the turning on of all of the remaining N−1 transistors in the first path. The transistors in the second path speed up the production of an output signal.

11 Claims, 5 Drawing Figures

INVENTOR.
Andrew G. F. Dingwall
BY
Henry Schanzer
ATTORNEY

INVENTOR.
Andrew G. F. Dingwall
BY
Henry Schanzer
ATTORNEY

APPARATUS FOR INCREASING THE SPEED OF SERIES CONNECTED TRANSISTORS

BACKGROUND OF THE INVENTION

In many circuits such as multi-input logic gates and in serial decoders, it is often desirable and/or necessary to have a string of transistors with their conduction paths connected in series between an output terminal and point of operating potential. When all the transistors of the string are turned on, substantial conduction occurs between the two terminals and a given logic function is performed.

Though the "on" impedance of any transistor in the string is extremely low relative to its "off" impedance, it still is of finite value. Depending on the geometry of the device, the "on" impedance of the transistor may vary between a few ohms and a few kilohms. In addition, associated with each of the transistor junctions there is some capacitance. Thus, when each transistor is turned on, it must discharge (or charge) its junction capacitance through its "on" impedance. The problem, as may be illustrated with the aid of FIGS. 1 and 2, is that the time delays are additive and where many transistors are serially connected between two terminals it takes longer for each successive transistor along the string to turn on.

The prior art circuit of FIG. 1 is a conventional five input NAND-gate using complementary metal-oxide-semi-conductor (C-MOS) transistors. Transistors $T_1$, $T_2$, $T_3$, $T_4$, and $T_5$ of N-conductivity type have their conduction paths connected in series between terminals 10 and 12. Transistors $T_6$, $T_7$, $T_8$, $T_9$, and $T_{10}$ of P-conductivity type have their conduction paths connected in parallel between terminals 12 and 14. $+V_{DD}$ volts, which, for example, may be equal to 10 volts, is applied to terminal 14; ground potential is applied to terminal 10; and terminal 12 is the output terminal.

Associated with each of the source-drain connections of transistors $T_1$ through $T_5$ are distribution and junction capacitances denoted by $C_1$, $C_2$, $C_3$, and $C_4$. Capacitor $C_5$ associated with output terminal 12 includes the junction capacitance of all the P-type transistors, that of transistor $T_5$, and the load capacitance. Capacitor $C_5$ is, therefore, much larger than any of the other junction capacitances.

Pulses A, B, C, C, and E are applied, respectively, to the gates of transistors $T_5$, $T_4$, $T_3$, $T_2$, and $T_1$ and to transistors $T_6$, $T_7$, $T_8$, $T_9$, and $T_{10}$. These pulses are bivalued having a value of zero volts or $+V_{DD}$ volts. When pulses A, B, C, D, and E are all made equal to $+V_{DD}$ volts and are applied at the same time, N-type transistors $T_1$ through $T_5$ are turned on, and P-type transistors $T_6$ through $T_{10}$ are turned off.

Transistors $T_1$ through $T_5$, however, do not turn on instantaneously, but in a sequential manner as illustrated in FIG. 2. A transistor such as $T_3$ which is further from the ground terminal than a transistor such as $T_2$ turns on later than $T_2$, with transistor $T_5$ taking the longest period of time to turn on (substantially longer than that of any other of the transistors) and to clamp the output terminal to ground potential. The slow clamping action of transistor $T_5$ is due in part to the large capacitance $C_5$ associated with the output terminal and in part to the series impedance of transistors $T_1$ through $T_4$. Until transistor $T_5$ turns on, the output capacitance is virtually decoupled from the rest of the series string. As a result, transistors $T_1$ through $T_4$, when turned on, discharge relatively quickly the capacitance at their drain and provide fast clamping action. However, transistor $T_5$ must now discharge a large capacitance in order to clamp the output terminal 12 to the ground potential applied at terminal 10.

In addition to the large capacitance ($C_5$), the "on" impedance of the other transistors are in the source leg of transistor $T_5$ adding to its "on" impedance.

Furthermore, as current flows through the "on" impedance of the various transistors, a voltage drop is developed across each transistor. This voltage drop is additive and causes the source electrode of each succeeding transistor above $T_1$ to be reverse biased with respect to the substrate which is maintained at ground potential. This effect, which may be referred to as the "substrate bias effect," causes an increase in the minimum "on" impedance of a transistor and, in addition, increases the threshold voltage of a transistor. Thus, where there are many transistors connected in series, as in this example, each succeeding transistor along the series string has an increasing reverse bias which further increases the minimum "on" impedance of each succeeding transistor. Capacitance $C_5$ must thus discharge through a relatively large impedance. This, of course results in a large RC time constant and in the considerable delay shown in FIG. 2.

It is a purpose of this invention to provide an improved circuit arrangement for increasing the speed of response of a series string of transistors.

SUMMARY OF THE INVENTION

N transistors, where N is an integer greater than two, having their conduction paths connected in series between an output terminal and a point of operating potential. First and second additional transistors have their conduction paths connected in series between said output terminal and said point. Means are provided for concurrently turning on said first additional transistors and that one of said N transistors whose conduction path is connected to said output terminal and means are coupled to the second additional transistor for turning it on when all of the remaining N−1 transistors are rendered conductive.

BRIEF DESCRIPTION OF THE DRAWINGS

In the accompanying drawings like reference characters denote like components.

DETAILED DESCRIPTION OF THE INVENTION

Figure 1:
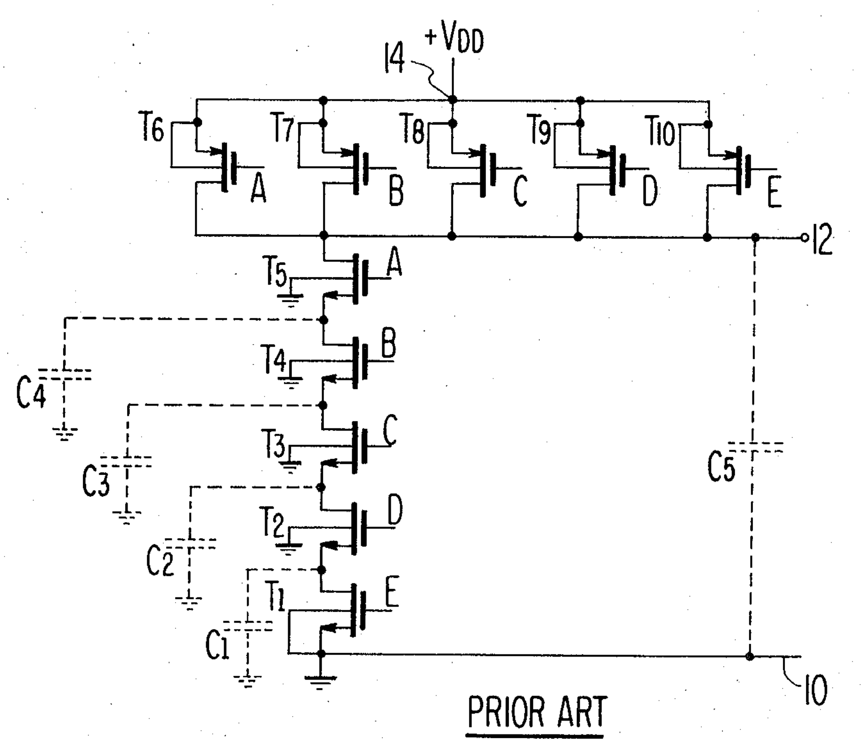
PRIOR ART Fig. 1.
FIG. 1 is a schematic diagram of a prior art five input NAND gate.
Figure 2:
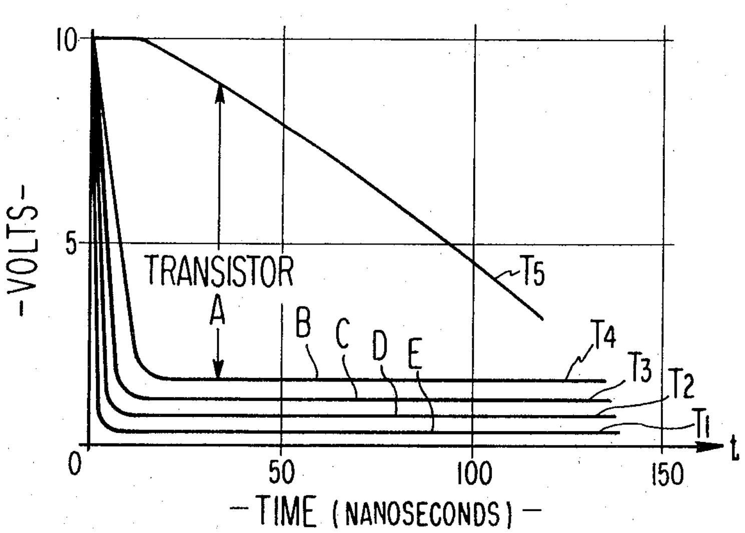
PRIOR ART Fig. 2.
FIG. 2 is a diagram showing a worst case switching performance of the N-type transistors of FIG. 1.
Figure 3:
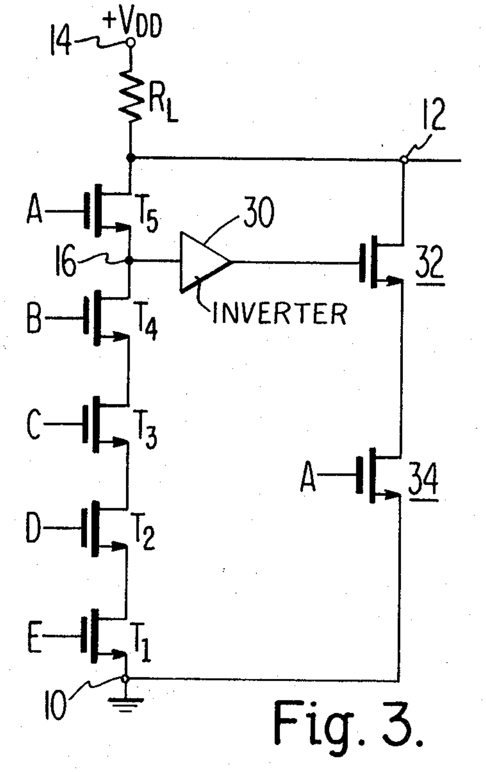
FIG. 3 is a schematic diagram of a circuit embodying the invention.

The circuit of FIG. 3 includes a series string of N-conductivity type transistors labeled $T_1$, $T_2$, $T_3$, $T_4$, and $T_5$ similar to those shown in FIG. 1, having their conduction paths connected in series between output terminal 12 and terminal 10. The latter may be connected to a source of reference potential such as ground. A load resistor $R_L$ is connected between terminals 12 and 14 and $+V_{DD}$ volts are applied to terminal 14. Inverter 30, which may be anyone of a number of well known inverters, has its input terminal connected to the source-to-drain connection 16 between transistors $T_5$ and $T_6$ and its output terminal connected to the gate of transistor 32. The conduction paths of N-type transistors 32 and 34 are connected in series between terminals 10 and 12. A signal denoted by the letter A is applied to the gates of transistors 34 and $T_5$, and signals B, C, D, and E are applied, respectively, to transistors $T_4$, $T_3$, $T_2$, and $T_1$.

The operation of the circuit is best understood by assuming that signals A, B, C, D, and E are switched from zero volts to $+V_{DD}$ potential in order to turn on all the transistors. The transistors, however, as described above do not turn on simultaneously even though energized simultaneously. Transistors $T_1$, $T_2$, $T_3$, $T_4$ turn on much faster than transistor $T_5$. This causes the potential at junction point 16 to decrease very quickly. Inverter 30 senses the decreasing potential at junction point 16 and produces a positive signal which is applied to the gate of transistor 32 and which turns it on. Concurrently, transistor 34 is turned on by the A signal applied to its gate. Transistors 32 and 34 thus provide a discharge path between terminals 10 and 12 in addition to the path provided by transistors $T_1$ through $T_5$. Transistors 32 and 34, as further described below, hasten the discharge of the output capacitance ($C_5$) and enable the speedy clamping of output terminal 12 to ground potential (terminal 10).

Transistors 32 and 34 may, by way of example, be made to have an "on" impedance in the range of tens of ohms as compared to the more typical value of transistors $T_1$ through $T_5$ which is measured in hundreds to thousands of ohms. To achieve these low impedance values, transistors 32 and 34 would be of relatively large size since the "on" impedance of a device is proportional to the width of its channel. But, since only two transistors are used in this conduction path, the increase in chip area to perform the function is not excessive. By using transistors (32, 34) of high conductivity and by having only two transistors connected in series, the substrate bias effect is minimized and the "on" impedance is kept low since the source-to-substrate region of the upper transistor (32) cannot be severely reverse biased.

In addition to making the conductivity of transistors 32 and 34 considerably higher than that of transistors $T_1$ through $T_5$, improved performance is obtained by making transistor $T_5$ (i.e., that transistor whose conduction path is connected to the output terminal) of much smaller size and hence of much lower conductivity than that of the other transistors in the circuit. Increasing the impedance of the transistor $T_5$ ensures that under all circumstances junction point 16 will be close to ground potential when transistors $T_1$, $T_2$, $T_3$, and $T_4$ are turned on. This is due in part to voltage divider action between the transistors comprising the series string. With the addition of transistors 32 and 34, the impedance of transistor $T_5$ may be made large to ensure that it does not turn on quickly. Making the impedance of transistor $T_5$ large minimizes the power dissipation through the series string of transistors $T_1$ through $T_5$. Also, making the impedance of transistor $T_5$ high means that transistor $T_5$ can be made physically small which offsets slightly the increase in chip area due to the addition of transistors 32 and 34.

The slow turn on and high impedance of transistor $T_5$ effectively decouples the sub-string comprising transistor $T_1$ through $T_4$ from the output terminal 12. This causes the inverter 30 hence transistor 32 to be turned on quickly. Since transistor 34 is independently driven, it turns on quickly and if all the turn-on signals are applied simultaneously, it should normally be on before transistor 34. Thus, by decoupling the substring and by sensing its response, a circuit having a quick response may be built with some increase in complexity.

Figure 4:
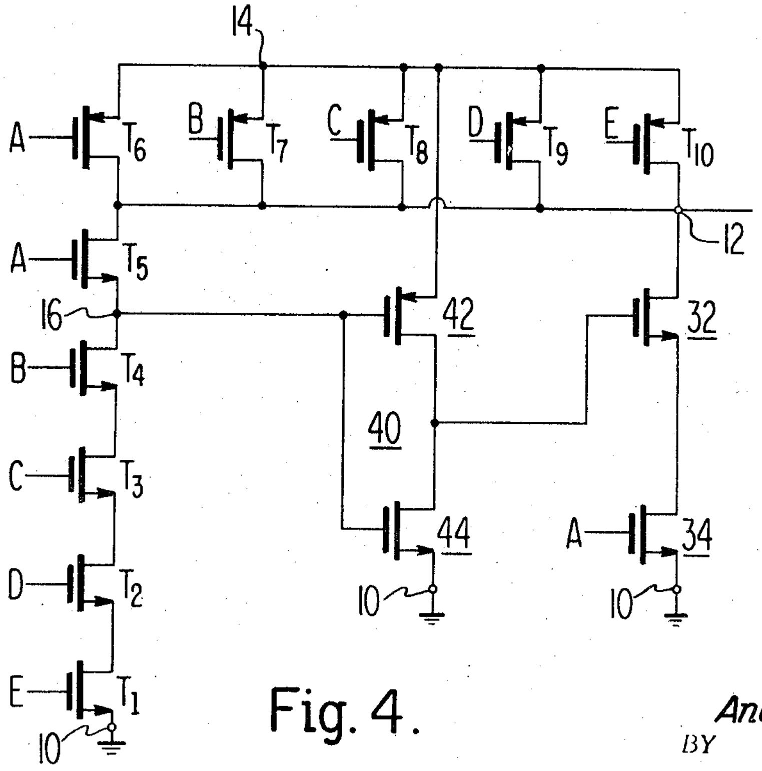
FIG. 4 is a schematic diagram of another embodiment of the invention.

The circuit of FIG. 4 includes a series string of transistors, $T_1$ through $T_5$, identical to that shown in FIG. 3. Five P-type transistors ($T_6$, $T_7$, $T_8$, $T_9$, and $T_{10}$) (similar to those shown in FIG. 1) having their conduction paths connected in parallel between terminals 12 and 14 replace the resistor $R_L$ shown in FIG. 3. The complementary inverter 40, comprising P-type transistor 42 and N-type transistor 44, replaces the inverter 30 of FIG. 3. The gates of transistors 42 and 44 are connected in common to junction point 16 and their sources are connected respectively to terminals 14 and 10 to which are applied $+V_{DD}$ volts and ground potential, respectively. The output terminal of inverter 40 is at the common connection of the drains of transistors 42 and 44. This terminal is connected to the gate of transistor 32. Transistors 32 and 34 are connected in series, as before, with the same signal (A) applied to the gate of transistors 34 and $T_5$.

The operation of the circuit is similar to that described in FIG. 3. Applying pulses of $+V_{DD}$ amplitude to all the P-type transistors and to all the N-type transistors, ensures that when the series string transistors ($T_1$ through $T_5$) are turned on that the five parallel transistors ($T_6$ through $T_{10}$) are turned off. This complementary action, well known in the art, minimizes the power dissipation in the circuit. With the series string enabled, transistor $T_1$ through $T_4$ turns on much more quickly than transistor $T_5$ quickly bringing junction point 16 close to ground potential. This turns on transistors 42 and cuts off transistor 44 causing a high potential approximately equal to $+V_{DD}$ to be applied to the gate of transistor 32 which turns the latter "on." In the meantime, the A signal applied to the gate of transistor 34 has turned it on and terminal 12 is thus quickly clamped to ground potential through the series conduction paths of transistors 32 and 34.

The speed of response of the circuit of FIG. 4 may be further increased by making transistor 42 physically much larger than transistor 44. This makes the on impedance of transistor 44 much larger than that of transistor 42. As a result, as soon as transistor 42 starts conducting the output of inverter 40, by impedance divider action, quickly goes high. By this method of early sensing the output of the substring comprising transistor $T_1$ through $T_4$, transistor 32 is turned on faster.

Figure 5:
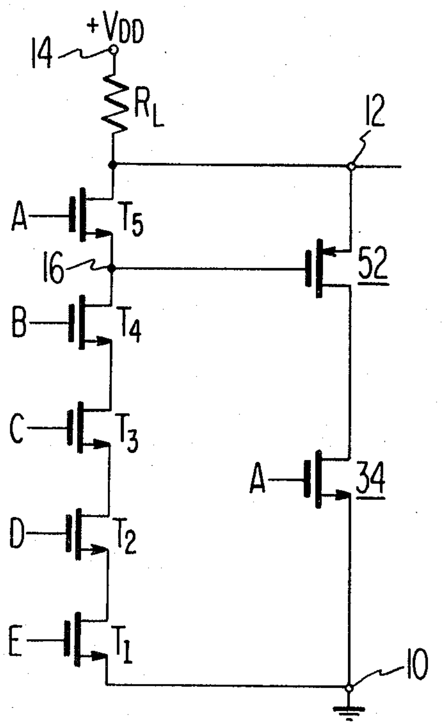
FIG. 5 is still another schematic diagram of a circuit embodying the invention.

The circuit of FIG. 5 includes a series string of transistors ($T_1$ through $T_5$) connected between terminals 12 and 10 and a resistor $R_L$ connected between terminals 12 and 14 as shown in FIG. 3. P-type transistor 52 having its source connected to output terminal 12 and its gate connected to junction point 16 replaces both inverter 30 and N-type transistor 32 shown in FIG. 3. The drain of transistor 52 is connected to the drain of transistor 34, whose source is connected to ground potential. As before, the same signal is applied to the gate of transistor $T_5$ and to the gate of transistor 34.

The operation of the circuit is again best understood by assuming that transistors $T_1$ through $T_5$ are all turned on by means of signals applied at their gates and that transistor $T_5$ turns on much more slowly than the remaining transistors in the series string. Transistors $T_1$ through $T_4$ turn on quickly bringing the potential at junction point 16 close to ground potential (terminal 10). As soon as the potential at junction point 16 falls below the potential at terminal 12 by more than the threshold voltage of transistor 52, the latter turns on. Since transistor 34 is turned on at the same time as transistors $T_1$ through $T_4$, it is presumably already "on" when transistor 52 is turned on. Since both transistors have relatively large conductances, they form a low impedance path between the output terminal 12 and terminal 10. Thus terminal 12 may be quickly clamped to terminal 10.

This circuit shows that the conductivity type of the transistors may be intermixed (transistor 52 is of the P-type conductivity and transistor 34 is of N-type conductivity). This scheme, therefore, is highly compatible with complementary metal-oxide-semiconductor circuits.

Although the series string, transistor $T_1$ through $T_5$, has been shown in the FIGURES to be of N-type conductivity, it should be obvious that a series string of P-type conductivity could similarly be employed. Also, the series string could include transistors of one or both conductivity with proper operation achieved by the selection of the polarity of the turn-on pulses. In addition, the series string could be connected between $+V_{DD}$ and the output terminal as well as between the output terminal and ground as shown in the FIGURES.

What is claimed is:

1. The combination comprising:

N transistors, each having a conduction path and a control electrode whose applied potential determines the conductivity of said conduction path, one of said N transistors having its conduction path connected between an output terminal and a junction point and the remaining (N−1) transistors of said N transistors having their conduction paths connected in series between said junction point and a first terminal adapted to receive a fixed potential, where N is an integer greater than two;

first and second additional transistors having their conduction paths connected in series between said output and first terminals;

means coupled to the control electrodes of said one transistor and to said first additional transistor for turning them on concurrently; and means coupling the control electrode of said second additional transistor to said junction point for turning on said second additional transistor when all of said N−1 transistors are turned on.

2. The combination as claimed in claim 1, wherein one of said first and second additional transistors is of one conductivity type and the other is of second conductivity type; and wherein said means coupling the second additional transistor to said junction point includes a neglible impedance means direct current connecting its control electrode to said junction point.

3. The combination as claimed in claim 1, wherein said one of said N transistors has an "on" impedance which for the same value of bias potential is much larger than the "on" impedance of each one of said N−1 transistors; and wherein the "on" impedance of said first and second additional transistors is much smaller than the "on" impedance of said N−1 transistors.

4. The combination as claimed in claim 1 wherein said N transistors and said first and second additional transistors are of the same conductivity type; and wherein said means coupling the second additional transistor to the junction point is an inverter.

5. The combination as claimed in claim 4, wherein said inverter includes a pair of transistors of complementary conductivity type; said pair of transistors having their control electrodes connected in common to said junction point and having one end of their conduction paths connected in common to the control electrodes of said second additional transistor; and wherein one transistor of said pair of transistors is turned off and the other transistor of said pair of transistors is turned on when said N−1 transistors are turned on.

6. The combination as claimed in claim 5, wherein that transistor of said inverter which turns on when said N−1 transistors are turned on has a substantially lower "on" impedance than the other transistor of said inverter for the same value of forward bias.

7. The combination as claimed in claim 4 further providing a second terminal for the application thereto of a fixed potential; and further including means for coupling said second terminal to said output terminal; said means producing a current flow into said terminal opposite in direction to the current flow through said N transistors.

8. The combination as claimed in claim 7, wherein said additional transistors and said N transistors are of first conductivity type; and wherein said means coupling said second terminal to said output terminal includes transistors of second conductivity type.

9. The combination as claimed in claim 7, wherein said transistors are insulated-gate field-effect transistors of the enhancement type.

10. In combination with a series string of N transistors, connected between an output terminal and a first potential point, for clamping said terminal to said point when said N transistors are turned on, the improvement comprising:

first and second transistors having their conduction paths connected in series between said output terminal and said point;

means coupled to the control electrode of that transistor of the series string whose conduction path is connected to said output terminal and to the control electrode of said first transistor for concurrently turning them on; and means coupled to the control electrode of said second additional transistor responsive to the conduction of the remaining transistors of said series string for turning on said second transistor when all of said remaining transistors are turned on.

11. The combination comprising:

an output terminal and a point of reference potential;

two paths connected in parallel between said output terminal and said point; the first path comprising the series connected conduction paths of N field-effect transistors, where N is an integer greater than two, and the second path comprising the series connected conduction paths of two transistors;

means for concurrently turning on one of the transistors in the second path and that transistor in the first path connected to the output terminal; and means for turning on the second transistor in the second path in response to the turning on of all of the remaining N−1 transistors in the first path.

* * * * *